United States Patent
Lee et al.

(10) Patent No.: US 8,248,447 B2
(45) Date of Patent: Aug. 21, 2012

(54) NETWORK VOICE AND VIDEO COMMUNICATION SYSTEM AND METHOD

(75) Inventors: Hou-Hsien Lee, Taipei Hsien (TW); Chang-Jung Lee, Taipei Hsien (TW); Chih-Ping Lo, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 671 days.

(21) Appl. No.: 12/427,709

(22) Filed: Apr. 21, 2009

(65) Prior Publication Data
US 2010/0245533 A1    Sep. 30, 2010

(30) Foreign Application Priority Data
Mar. 24, 2009    (CN) .......................... 2009 1 0301083

(51) Int. Cl.
*H04N 7/14*    (2006.01)
(52) U.S. Cl. ................. 348/14.01; 348/14.03; 348/14.12
(58) Field of Classification Search .... 348/14.01–14.16; 715/758; 709/204, 206
See application file for complete search history.

(56) References Cited

U.S. PATENT DOCUMENTS

| | | | | |
|---|---|---|---|---|
| 7,831,917 B1* | 11/2010 | Karam | ........................... | 715/753 |
| 2003/0182399 A1* | 9/2003 | Silber | ........................... | 709/219 |
| 2006/0148512 A1* | 7/2006 | Ekholm et al. | ............. | 455/550.1 |
| 2007/0279427 A1* | 12/2007 | Marks | ........................... | 345/581 |
| 2008/0049107 A1 | 2/2008 | Hii et al. | | |

FOREIGN PATENT DOCUMENTS

CN    101035260 A    9/2007

* cited by examiner

*Primary Examiner* — Melur Ramakrishnaiah
(74) *Attorney, Agent, or Firm* — Altis Law Group, Inc.

(57) ABSTRACT

A network voice and video communication system for communicating with remote computer users via at least two chat applications. The network voice and video communication system captures voice and image data, acquires voice and image data, and stores voice and image data. The network voice and video communication system further receives transmission instructions from the at least two chat applications and transmits the voice and image data to the at least two chat applications. The at least two chat applications simultaneously transmits the voice and image data to corresponding network addresses of the remote computer users.

19 Claims, 2 Drawing Sheets

NETWORK VOICE AND VIDEO COMMUNICATION SYSTEM AND METHOD

BACKGROUND

1. Technical Field

The present disclosure relates to voice and video communication, and more particularly to a network voice and video communication system and method.

2. Description of Related Art

Generally, a network camera providing network voice and video communication to a computer can only be employed by a single application. For example, the camera cannot be employed by Microsoft service network (MSN) Messenger and SKYPE at the same time, limiting effectiveness of the system.

DETAILED DESCRIPTION

Figure 1:
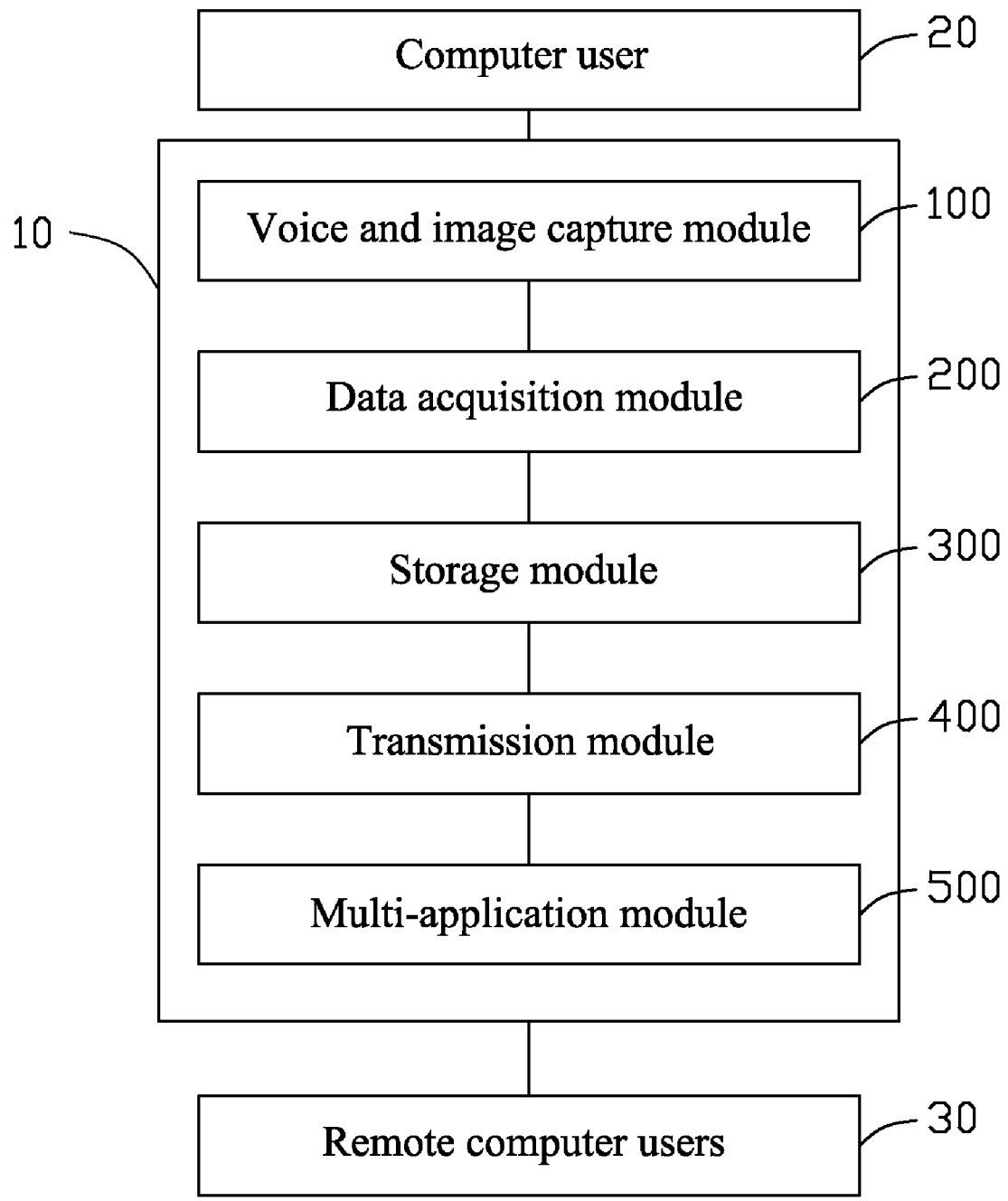
FIG. 1 is a block diagram of an exemplary embodiment of a network voice and video communication system.

Referring to FIG. 1, an exemplary embodiment of a network voice and video communication system 10 includes a voice and image capture module 100, a data acquisition module 200, a storage module 300, a transmission module 400, and a multi-application module 500. The network voice and video communication system 10 is configured for communication of a computer user 20 and remote computer users 30. The computer user 20 and the remote computer users 30 may connect to the network voice and video communication system via a communication network, such as the Internet or an intranet.

The voice and image capture module 100 is configured for capturing voice and images of the computer user 20, and can include a network camera and/or a network telephone, or a microphone. The network camera captures image data for different chat applications such as Microsoft service network (MSN) Messenger, SKYPE and others. The network telephone or microphone may capture corresponding voice data.

The data acquisition module 200 acquires voice and image data from the voice and image capture module 100. The voice and image data may include pixels, color, and/or audio frequencies of the voice and image data.

The storage module 300 temporarily stores the voice and image data acquired by the data acquisition module 200, and may be a random access memory (RAM).

The transmission module 400 receives transmission instructions from the multi-application module 500 to select the voice and image data from the storage module 300 and transmit the voice and image data to the multi-application module 500. The transmission module 400 may be a driver program. After receiving the transmission instructions, the transmission module 400 transmits the voice and image data from the storage module 300 to the multi-application module 500.

The multi-application module 500 includes at least two chat applications, such as SKYPE and MSN Messenger. The multi-application module 500 sends the transmission instructions to the transmission module 400 and receives the voice and image data therefrom, then transmits the voice and image data to corresponding network addresses (e.g., Internet protocol addresses) of remote computer users 30 on the network via the at least two chat applications simultaneously.

Alternatively, the voice and image capture module 100 may include a screen capture capability and/or a network telephone or microphone. Current display and audio output are thus available simultaneously via different chat applications.

Figure 2:
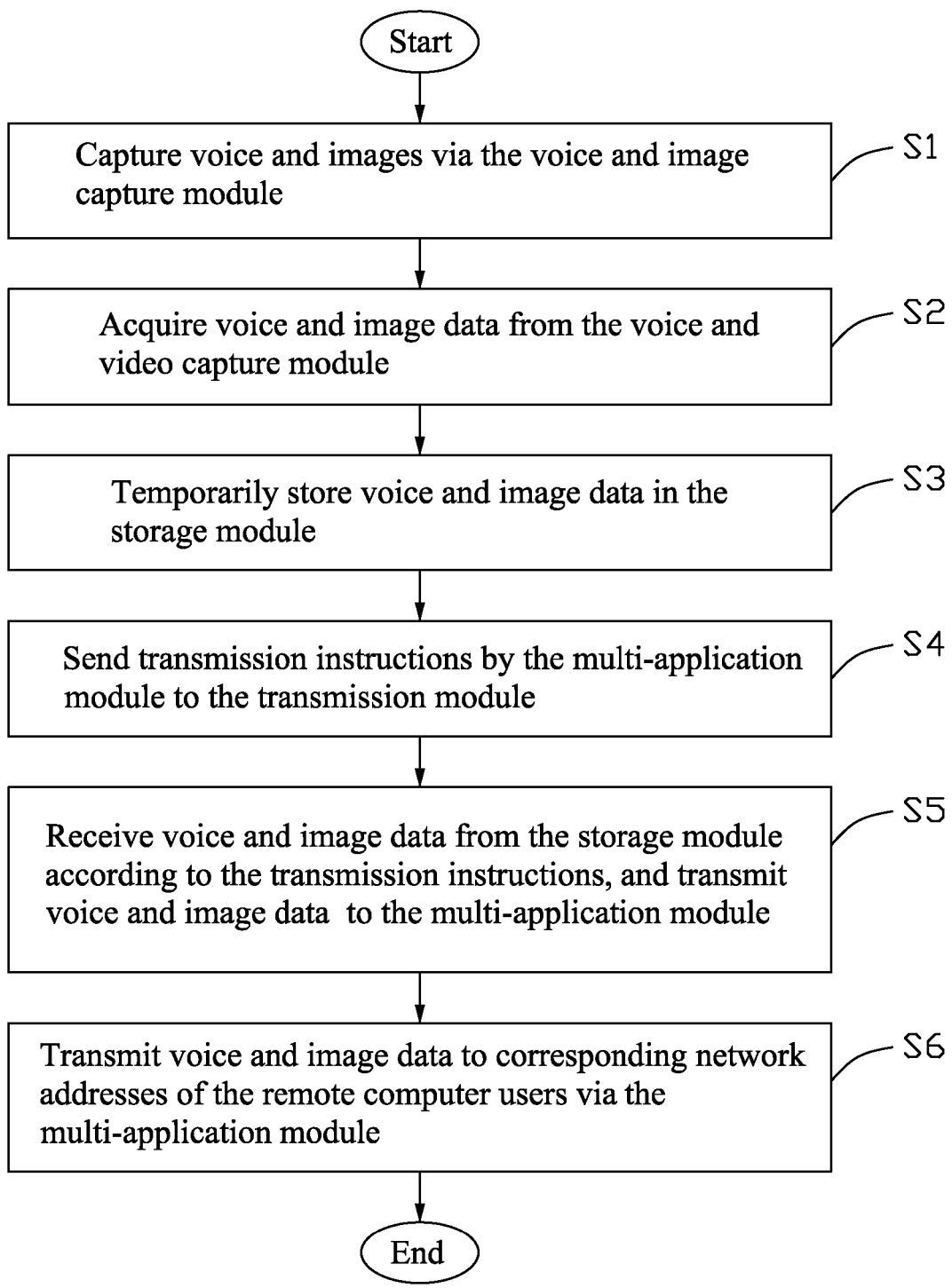
FIG. 2 is a flowchart of an exemplary embodiment of a network voice and video communication method.

Referring to FIG. 2, a network voice and video communication method is provided, which includes the following blocks.

In block S1, the voice and image module 100 captures voice and images of the remote computer user 30.

In block S2, the data acquisition module 200 acquires voice and image data of the captured voice and images from the voice and image capture module 100.

In block S3, the storage module 300 temporarily stores the voice and image data from the data acquisition module 200.

In block S4, the multi-application module 500 sends transmission instructions to the transmission module 400.

In block S5, the transmission module 400 receives the voice and image data from the storage module 300 according to the transmission instructions from the multi-application module 500, and transmits the voice and image data to the multi-application module 500.

In block S6, the multi-application module 500 transmits the voice and image data to the corresponding network addresses of the remote computer users 30.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A network voice and video communication system for communicating with remote computer users via at least two different kinds of chat applications, the system comprising:
    a voice and image capture module to capture voice and images;
    a data acquisition module to acquire voice and image data of the voice and images from the voice and image capture module;
    a storage module to temporarily store the voice and image data acquired by the data acquisition module;
    a transmission module to receive transmission instructions from the at least two different kinds of chat applications and select the voice and image data from the storage module according to the transmission instructions, and transmit the selected voice and image to the at least two different kinds of chat applications; and
    a multi-application module comprising the at least two different kinds of chat applications to transmit the transmission instructions, receive the selected voice and image data from the transmission module, and transmit the selected voice and image data via the at least two different kinds of chat applications simultaneously to corresponding network addresses of the remote computer users.

2. The system of claim 1, wherein the voice and image data comprises pixels, colors, and audio frequencies of the voice and image data.

3. The system of claim 1, wherein the voice and video capture module is a network camera.

4. The system of claim 1, wherein the voice and video capture module is a screen capture application.

5. The system of claim 1, wherein the voice and video capture module is a network telephone.

6. The system of claim 1, wherein the voice and video capture module is a microphone.

7. The system of claim 1, wherein the storage module is a random access memory.

8. The system of claim 1, wherein the transmission module is a driver program, configured for receiving the transmission instructions from the multi-application module, and transmitting the voice and image data from the storage module to the multi-application module.

9. A network voice and video communication method for communicating with remote computer users via at least two different kinds of chat applications, the method comprising:
   selecting a voice and video capture module to capture voice and images;
   acquiring voice and image data from the voice and video capture module;
   storing the voice and image data in a memory system;
   sending transmission instructions by at least two chat applications;
   selecting voice and image data from the memory system according to the transmission instructions, and transmitting the selected voice and image data to the at least two different kinds of chat applications; and
   transmitting the voice and image data via the at least two chat applications simultaneously to corresponding network addresses of the remote computer users.

10. The method of claim 9, wherein the voice and image data comprises pixels, colors, and audio frequencies.

11. The method of claim 9, wherein the voice and video capture module is a network camera.

12. The method of claim 9, wherein the voice and video capture module is a screen capture application.

13. The method of claim 9, wherein the voice and video capture module is a network telephone.

14. The method of claim 9, wherein the voice and video capture module is a microphone.

15. A non-transitory computer-readable medium having instructions stored thereon that, when executed by a computer comprising a voice and image capture module and at least two different kinds of chat applications, the computer-readable medium causes the computer to:
   select a voice and video capture module to capture voice and images;
   acquire voice and image data from the voice and video capture module;
   store the voice and image data in a memory system;
   send transmission instructions by at least two chat applications;
   selecting voice and image data from the memory system according to the transmission instructions, and transmit the selected voice and image data to the at least two different kinds of chat applications; and
   transmit the voice and image data via the at least two different kinds of chat applications simultaneously to corresponding network addresses of remote computer users.

16. The medium of claim 15, wherein the voice and image data comprise pixels, colors, and audio frequencies.

17. The medium of claim 15, wherein the voice and video capture module is a network camera.

18. The medium of claim 15, wherein the voice and video capture module is a network telephone.

19. The medium of claim 15, wherein the voice and video capture module is a screen capture application.

* * * * *